US010152676B1

(12) United States Patent
Strom (10) Patent No.: US 10,152,676 B1
(45) Date of Patent: Dec. 11, 2018

(54) DISTRIBUTED TRAINING OF MODELS USING STOCHASTIC GRADIENT DESCENT

(71) Applicant: Amazon Technologies, Inc., Reno, NV (US)

(72) Inventor: Nikko Strom, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 14/087,852

(22) Filed: Nov. 22, 2013

(51) Int. Cl.
*G06N 3/08* (2006.01)
*G06N 99/00* (2010.01)

(52) U.S. Cl.
CPC .............. *G06N 99/005* (2013.01); *G06N 3/08* (2013.01)

(58) Field of Classification Search
CPC ......... G06N 3/08; G06N 99/005; G06F 15/18
See application file for complete search history.

(56) References Cited

U.S. PATENT DOCUMENTS

| | | | | |
|---|---|---|---|---|
| 5,226,092 | A * | 7/1993 | Chen | 382/157 |
| 8,489,529 | B2 * | 7/2013 | Deng et al. | 706/25 |
| 8,626,677 | B2 * | 1/2014 | Chen et al. | 706/12 |
| 9,031,844 | B2 * | 5/2015 | Yu et al. | 704/256 |
| 2006/0112026 | A1 * | 5/2006 | Graf | G06K 9/6269 706/14 |
| 2009/0216696 | A1 * | 8/2009 | Downs et al. | 706/20 |
| 2010/0223212 | A1 * | 9/2010 | Manolescu et al. | 706/12 |
| 2011/0075569 | A1 * | 3/2011 | Marrow | H04L 1/0019 370/242 |
| 2014/0236578 | A1 * | 8/2014 | Malon et al. | 704/9 |
| 2015/0100530 | A1 * | 4/2015 | Mnih et al. | 706/25 |
| 2015/0127337 | A1 * | 5/2015 | Heigold | G10L 15/063 704/232 |

OTHER PUBLICATIONS

Residual Algorithms: Reinforcement Learning with Function Approximation Residual Algorithms: Reinforcement Learning with Function Approximation Leemon Baird Department of Computer Science U.S. Air Force Academy, CO 80840-6234 Jul. 15, 1995.*

(Continued)

*Primary Examiner* — Eric Nilsson
(74) *Attorney, Agent, or Firm* — Knobbe Martens, Olson & Bear, LLP (57) ABSTRACT

Features are disclosed for distributing the training of models over multiple computing nodes (e.g., servers or other computing devices). Each computing device may include a separate copy of the model to be trained, and a subset of the training data to be used. A computing device may determine updates for parameters of the model based on processing of a portion of the training data. A portion of those updates may be selected for application to the model and synchronization with other computing devices. In some embodiments, the portion of the updates is selected based on a threshold value. Other computing devices can apply the received portion of the updates such that the copy of the model being trained in each individual computing device may be substantially synchronized, even though each computing device may be using a different subset of training data to train the model.

26 Claims, 6 Drawing Sheets

(56) References Cited

OTHER PUBLICATIONS

Gemulla, R., et al. "Large-scale matrix factorization with distributed stochastic gradient descent." Proceedings of the 17th ACM SIGKDD international conference on Knowledge discovery and data mining. ACM, 2011.*

Grisetti, G., et al. "A Tree Parameterization for Efficiently Computing Maximum Likelihood Maps using Gradient Descent." Robotics: Science and Systems. 2007.*

Dean, Jeffrey, et al. "Large scale distributed deep networks." Advances in neural information processing systems. 2012.*

* cited by examiner

DISTRIBUTED TRAINING OF MODELS USING STOCHASTIC GRADIENT DESCENT

BACKGROUND

Models representing data relationships and patterns, such as functions, algorithms, systems, and the like, may accept input (sometimes referred to as an input vector), and produce output (sometimes referred to as an output vector) that corresponds to the input in some way. In some implementations, a model is used to generate a likelihood (or set of likelihoods) that the input corresponds to a particular value. For example, an automatic speech recognition ("ASR") system may utilize various models to recognize speech, such as an acoustic model and a language model. The acoustic model is used on features of audio data to generate hypotheses regarding which words or subword units (e.g., phonemes) correspond to an utterance captured in the audio data. The language model is used to determine which of the hypotheses generated using the acoustic model is the most likely transcription of the utterance. As another example, natural language understanding ("NLU") systems typically include models for named entity recognition, intent classification, and the like. The natural language understanding models can be used to determine an actionable intent from the words that a user speaks or writes.

The parameters of models can be set in a process referred to as "training." Models can be trained using training data that includes input data and the correct or preferred output of the model for the corresponding input data. The model can be used to process the input data, and the parameters of the model can be modified until the model produces (or "converges" on) the correct or preferred output. One method of training models uses the stochastic gradient descent technique. In stochastic gradient descent, a modification to each parameter of a model is based on the error in the output produced by the model. A derivative, or "gradient," can be computed that corresponds to the direction in which each individual parameter of the model is to be adjusted in order to improve the model output (e.g., to produce output that is closer to the correct or preferred output for a given input). In stochastic gradient descent, the gradient is computed and applied for a single input vector at a time, or aggregated from a small number of input vectors, rather than the entire set of training data. Therefore, the gradient may be referred to as a "partial gradient" because it is not based on the entire corpus of training data. Instead, it is based on the error that occurs when processing only a particular subset of the training data. Subsets or "mini-batches" of training data can be processed iteratively and the model parameters can be iteratively updated until the output converges on the correct or preferred output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to distributing, over multiple computing nodes, the training of models using stochastic gradient descent. Models (e.g., computer-generated or computer-maintained models, such as artificial neural networks, conditional random fields, support vector machines, and the like) can be trained using training data that includes input data and correct or expected output data that corresponds to the input data. During training, the models are used to process the training data input, and parameters of the models can be adjusted based on the difference between the output produced by the model and the correct output associated with the training data input. For example, in stochastic gradient descent a model takes an input vector from the training data and produces an output vector. The error for each input vector and output vector (or a group of input vectors and corresponding output vectors), when compared to the known correct or preferred output, can then be determined. A set of updates to the individual parameters of the model can be computed from the error. This set of updates may include a separate update value for each trainable parameter of the model. The model parameters can be then be updated accordingly, improving the accuracy of the model for the portion of training data upon which the update is based. The process of taking an input vector, producing an output vector, and determining updates to the trainable parameters can be performed iteratively until the model is trained (e.g., until the error is zero, no longer reducible, or otherwise satisfactory).

For large models (e.g., models with millions of parameters), the training process can be time consuming and resource intensive, particularly when there is also a large corpus of training data. Although distributed computing often reduces the time required to perform various computing processes, distributing the training of models over multiple computing nodes may introduce additional issues or may not otherwise be feasible. For example, splitting the training data among multiple physical devices and processing the data with separate copies of the model may require that each update to the trainable parameters, or the updated trainable parameters themselves, be continuously synchronized across all computing devices; otherwise, the various computing devices will be training different versions of the model. The volume of data that is transmitted to synchronize millions of parameters can be quite large, thereby introducing network latencies and bandwidth issues such that any performance increase from using multiple devices may be partially or completely negated. As another example, splitting the model itself and training the different portions of the model separately at different computing devices may not be feasible if the parameters are interconnected (e.g., as in densely connected neural networks).

Aspects of this disclosure relate to efficiently distributing the training of models across multiple computing nodes (e.g., two or more separate computing devices). A copy of a model to be trained can be provided to each of multiple computing devices, and each of the multiple computing devices can use a different portion of the training data to train the model. In order to ensure that the various copies of the model remain synchronized during the training process, any updates to the parameters of the model made at one computing device can be provided to all of the other computing devices so that the same update can be applied to parameters of the copies of the model on the other computing devices as well. In order to reduce the bandwidth required to continuously or periodically exchange such update data among the multiple computing devices, only those updates which are expected to provide a substantive change to the model may be applied and exchanged. For example, when using stochastic gradient descent to train a neural network (e.g., a deep neural network), a computing device may compute a gradient (e.g., a set of elements with a separate update value for each parameter of the model) for each input vector of training data, or for some subset of training data. Rather than update every parameter of the model based on the gradient, only those elements with update values meeting or exceeding a threshold, or meeting some other criteria, may be applied. In some embodiments, a threshold may be chosen such that the number of elements with update values exceeding the threshold, and therefore the number of parameters to be updated, is one or more orders of magnitude smaller than the total number of updates that have been calculated (e.g., $\frac{1}{100}$, $\frac{1}{1000}$, or $\frac{1}{10000}$ of the millions of parameters in the model). A given computing device can apply the update values exceeding the threshold and also transmit those updates to the other computing devices so that the updates can be applied at the other computing devices, thereby keeping the models synchronized. This can improve the efficiency of the distributed training process by substantially reducing the volume of data that is transmitted and the number of times a given parameter is updated. In some embodiments, the threshold may be chosen to optimize bandwidth requirements in light of the number of iterations through the training data that must be performed in order to train the model (e.g., for the model to converge).

Additional aspects of the present disclosure relate to saving the update values that do not meet or exceed the threshold described above. Rather than discarding the smaller update values of the gradient altogether, they can be saved in a "residual gradient" along with elements from previous and subsequent iterations. When the update value for a particular parameter meets or exceeds the threshold, it can be applied (and sent to the other computing devices), and the residual gradient element for that particular parameter can be cleared (e.g., the update value set to zero or null). In some embodiments, each time a computing device determines a partial gradient for a portion of training data, the partial gradient may be added to the residual gradient. The threshold determination may then be made based on the sum of the partial gradient and the residual gradient, rather than on the newly calculated partial gradient alone. The portions of that sum that do not exceed the threshold (e.g., the individual elements with values close to zero) can then be stored as the new residual gradient, and the process may be repeated as necessary. In this way, updates which may be substantial in aggregate may be retained, while updates which are too small to make a substantial difference to the model, or which may be cancelled by other updates calculated in a subsequent iteration, are not applied. In addition, each computing device can maintain its own residual gradient, and the updates that do not meet or exceed the threshold are not transmitted to the other computing devices. In this way, the bandwidth savings described above can be maintained, while all updates to the parameters calculated at a given computing device can be preserved for future use.

Further aspects of the present disclosure relate to additional methods of reducing the size or volume of model parameter synchronization data that is transmitted to other computing devices in order to realize additional bandwidth savings. In some embodiments, the updates that exceed the threshold described above are quantized or otherwise compressed in order to further reduce the size (e.g., the number of bits or bytes) of each update value. The quantized gradient values are then applied to the parameters of the local copy of the model and are also transmitted to the other computing devices for application to the respective copies of model. In order to retain the entire magnitude of the originally calculated update (e.g., the pre-quantized update values), the quantization error for each of the quantized values is added to the corresponding value of the residual gradient (e.g., the value of the residual gradient that corresponds to the same model parameter). In this way, the bandwidth that is required to transmit the update values may be further reduced without any loss of information by the training process as a whole.

Although aspects of the embodiments described in the disclosure will focus, for the purpose of illustration, on distributed execution of stochastic gradient descent to train neural network-based models, one skilled in the art will appreciate that the techniques disclosed herein may be applied to any number of services, processes, or applications. For example, other types of models may be similarly trained, such as conditional random fields ("CRFs"), stochastic support vector machines ("SVMs"), and the like. In addition, the techniques disclosed herein are not limited to stochastic gradient descent based training, but may be used with any method that involves iterative updating of a large number of interconnected model parameters. Various aspects of the disclosure will now be described with regard to certain examples and embodiments, which are intended to illustrate but not limit the disclosure.

Distributed Model Training Environment

Figure 1:
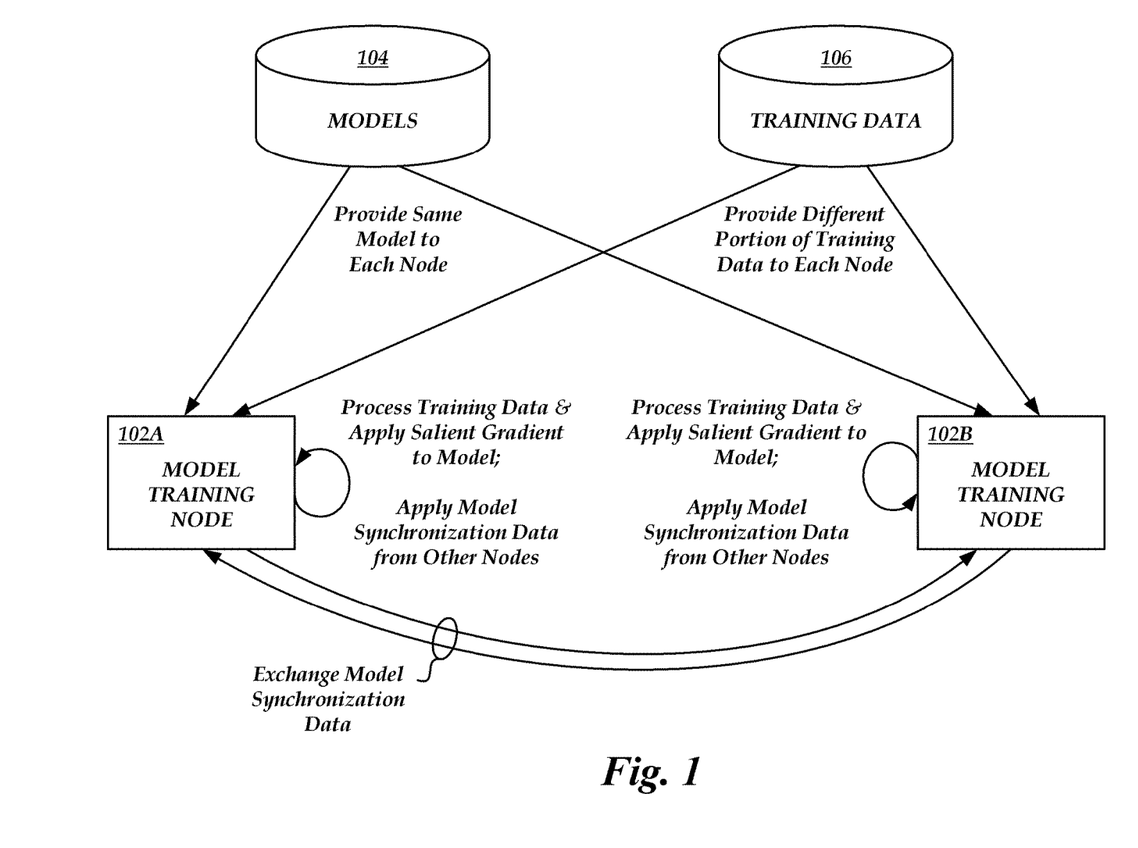
FIG. 1 is a block diagram of an illustrative architecture for distributing execution, over multiple computing nodes, of a process to train models.

With reference to an illustrative embodiment, FIG. 1 shows multiple model training nodes 102A, 102B. Although two model training nodes 102A, 102B are shown in FIG. 1, any number of model training nodes may be used. The model training nodes 102A, 102B may each obtain a copy of the model to be trained from a models data store 104. Each of the nodes 102A, 102B may also obtain a different subset of training data from a training data store 106. For example, a corpus of training data may be partitioned into equal parts for each model training node. In some embodiments, the amount of training data provided to any particular model training node 102A, 102B may not be equal to the amount of training data provided to some other model training node.

The training data can include input data that in many ways mimics or approximates input data upon which the model will be expected to operate during normal usage. In addition, the training data may include output data that corresponds to the known correct or otherwise expected output for a given input. Training a model typically involves processing the training data with the model and adjusting model parameters until the model output converges on the correct output.

In one specific non-limiting example, the model to be trained may be a neural network for automatic speech recognition ("ASR"), such as an acoustic model. The neural network may be configured to accept input vectors that include some number of feature vectors computed from audio data of user utterances. The neural network may operate on the input vectors, applying weights at any number of internal layers of the neural network, eventually producing an output vector. The output vector may include a likelihood, for each phoneme or other subword unit of a given language, that the input vector corresponds to the particular phoneme or other subword unit. Training data for such a neural network can include feature vectors computed from audio of user utterances, and known correct transcriptions of the user utterances, or known correct phonemes for each feature vector, etc.

As shown in FIG. 1, each model training node 102A, 102B can process a different portion of the training data. In the neural network example above, a given model training node 102A can use the neural network to process a particular input vector from its portion of the training data, and generate an output vector. The model training node 102A can determine the difference between the output vector and the correct output (e.g., determine the "error" for a particular subset of input data). The model training node 102A can then determine how the parameters of the model should be updated or modified in order to reduce the error, as described in greater detail below. Generally described, the collection of updates to the parameters of a model may be referred to as a "gradient" because each update is based on the direction in which the corresponding parameter should be modified (e.g., a value of the parameter is to be increased or decreased by a particular amount). When gradient descent is used, the gradient includes a collection of updates to all parameters of a model (e.g., a collection of values by which the parameters are to be adjusted) based on the entire corpus of training data. In stochastic gradient descent, a gradient is computed for subsets of the training data, which may be referred to as "mini-batches." Because this particular gradient is based on less than the entire corpus of training data, it may be referred to as a "partial gradient." The partial gradient may nevertheless include an update value for each individual parameter of the model.

Figure 3:
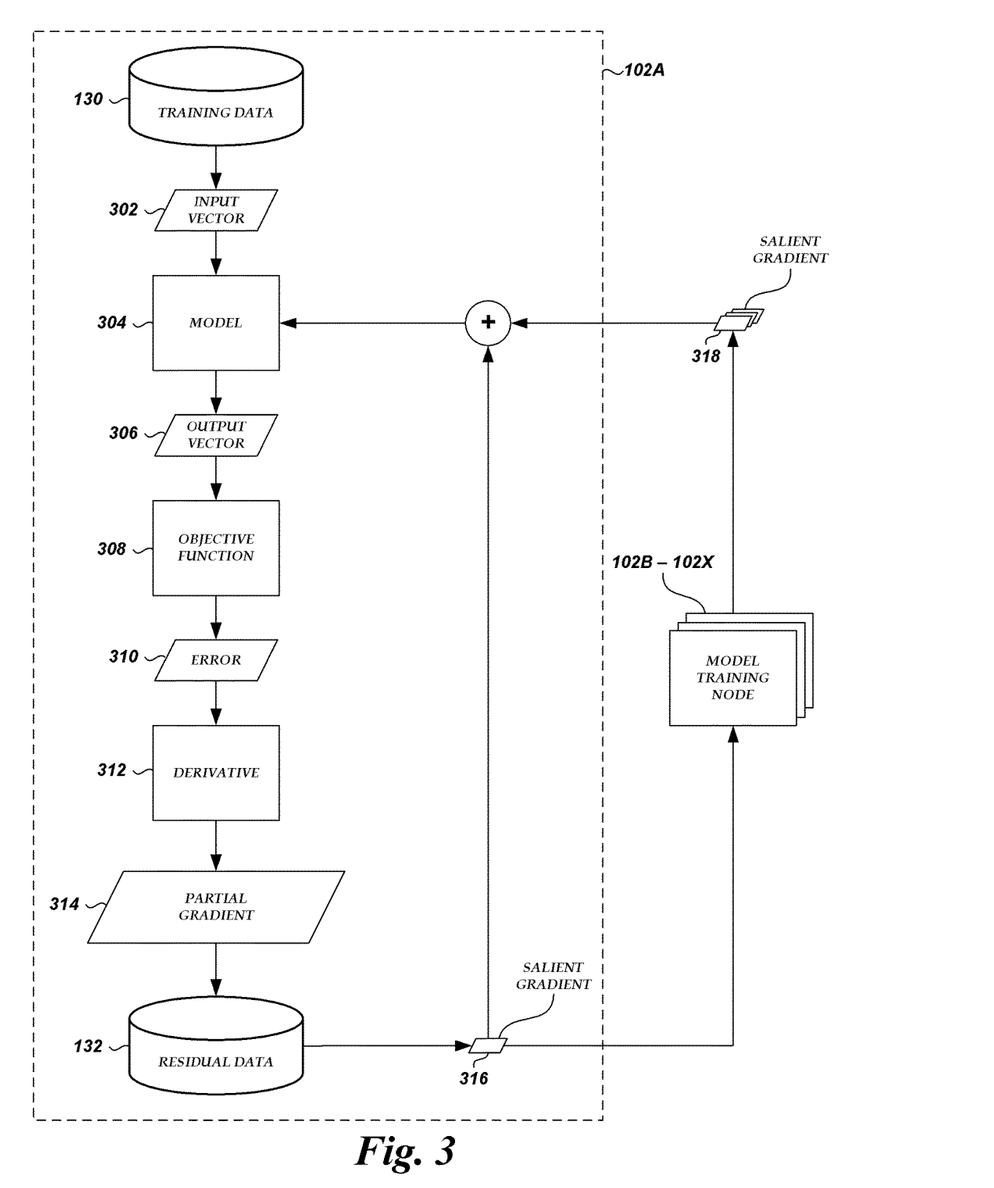
FIG. 3 is a block diagram of illustrative data flows that occur in some embodiments of distributed model training.
Figure 4:
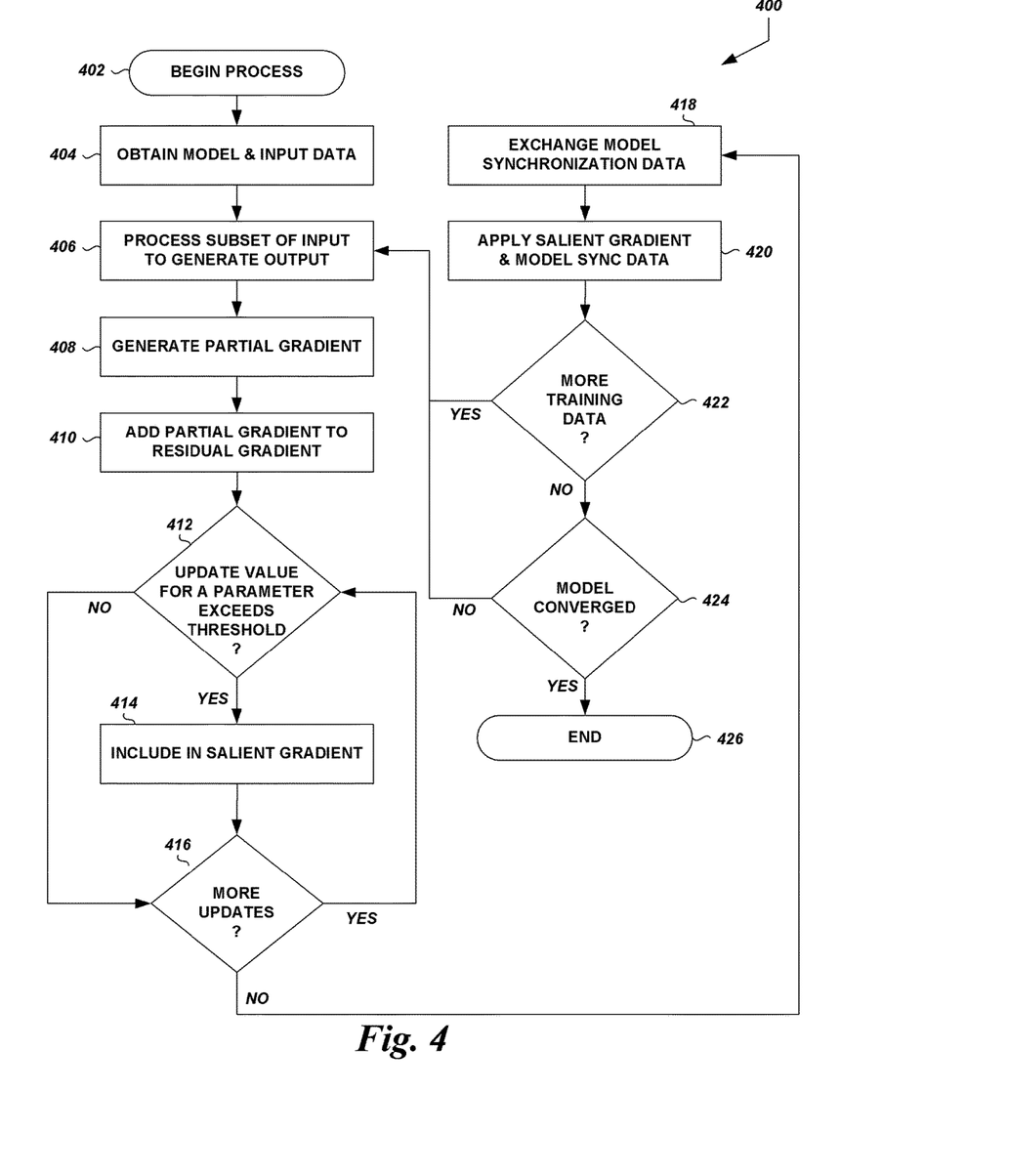
FIG. 4 is a flow diagram of an illustrative process for distributed model training using stochastic gradient descent.

A model training node 102A, 102B may determine which individual update values will make a substantial difference in the model. This subset of update values may be referred to as the "salient gradient." In some embodiments, only those update values that meet or exceed some predetermined or dynamically determined threshold may be included in the salient gradient. As shown, each model training node 102A, 102B may apply its own salient gradient to its own local copy of the model in order to modify the parameters of the model. Because each model training node determined the salient gradient based on output from different training data input, the models of each training node 102A, 102B may no longer be the same. In order to ensure that each copy of the model being trained is using the same parameters, the model training nodes 102A, 102B may exchange model synchronization data. The model synchronization data may include the salient gradient that each respective model training node 102A, 102B applied to its own copy of the model. When the other model training nodes apply the same salient gradient, the models will once again be synchronized, even though each node is using a different subset of training data to train its copy of the model. FIGS. 3 and 4, described in greater detail below, illustrate an example process and internal data flows that may be used by model training nodes in such a distributed model training environment.

Each of the model training nodes 102A, 102B may be individual commuting devices, such as computer servers, or may include multiple computing devices, such as computer servers logically or physically grouped together. The components of the model training nodes 102A, 102B can each be implemented as hardware, such as a server computing device, or as a combination of hardware and software. The models data store 104 and/or the training data store 106 of the distributed model training environment illustrated in FIG. 1 can correspond to a logical association of one or more computing devices for hosting and serving data over a network. For example, models data store 104 or training data store 106 may be implemented on a single database server or group of servers, or on separate database servers or groups of servers. In some embodiments, one or more of the data sources 104, 106 may be included on the same physical computing device or logical group of computing devices as one or more of the model training nodes 102A, 102B.

The model training servers 102A, 102B and data sources 104, 106 of the distributed model training environment illustrated in FIG. 1 may communicate with each other via a communication network. The network may include a private network, personal area network, local area network, wide area network, or the like (e.g. a corporate or university network). In some embodiments, the network may be a publicly accessible network of linked networks, possibly operated by various distinct parties, such as the Internet. In other embodiments, the network may be some other network or combination of networks.

In some embodiments, the features and services provided by the model training nodes 102A, 102B and/or the data sources 104, 106 may be implemented as services consumable via a communication network. In further embodiments, the model training nodes 102A, 102B and/or data sources 104, 106 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
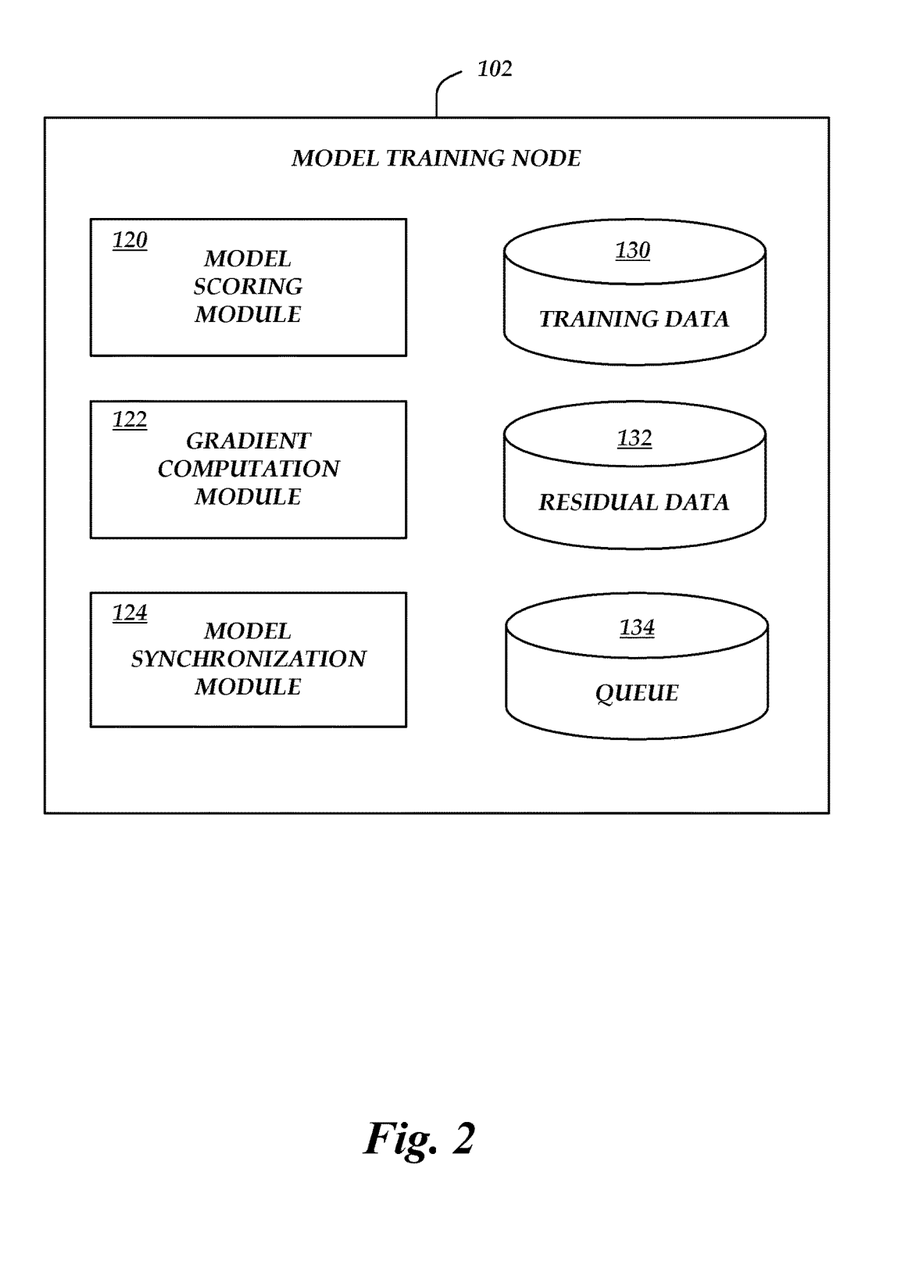
FIG. 2 is a block diagram of an illustrative computing node that can be used in a distributed model training environment.

FIG. 2 shows an illustrative model training node 102 with various modules and data stores. For example, a model training node 102 may include a model scoring module 120 for using the model to process input and generate output, a gradient computation module 122 for computing a gradient based on the output from the model scoring module 120, and a model synchronization module 124 for generating and exchanging model synchronization data with other model training nodes. The model training node 102 may also include various data stores, such as a training data store 130 that stores the portion of training data used by the model training node 102, a residual data store 132 that stores the update values that have not yet been applied to the model or exchanged with other model training nodes, and a queue 134 that stores model synchronization data that has been received from other model training nodes but which has not yet been applied to the copy of the model being trained by this particular model training node 102. The example modules and data stores illustrated in FIG. 2 are illustrative only, and are not intended to be limiting. In some embodiments, a model training node 102 may include additional or fewer models or data stores than those shown.

Process for Distributed Training of Models

FIG. 3 illustrates sample data flows within a model training node 102A and among multiple model training nodes 102A-102X that may occur during distributed training of models according to the techniques of the present disclosure. FIG. 4 illustrates a sample process 400 for distributed training of models. A model training node 102A may implement the data flows and execute the process of FIGS. 3 and 4 to train a local copy of a model based on a subset of training data while synchronizing with other model training nodes that are also training local copies of the model based on different subsets of the training data. Advantageously, the model training nodes may only exchange and apply a limited amount of model synchronization data in order to keep the various local copies of the models synchronized (or substantially synchronized), thereby limiting bandwidth requirements and improving efficiency and performance.

The process 400 begins at block 402. For example, process 400 may begin manually (e.g., in response to administrator initiation) or automatically (e.g., as scheduled or in response to some other event). The process 400 may be embodied in a set of executable program instructions stored on non-transitory computer-readable media, such as short-term or long-term memory of one or more computing devices associated with a model training node 102A. When the process 400 is initiated, the executable program instructions can be loaded and executed by the one or more computing devices.

At block 404, the model training node 102A can obtain a copy of the model to be trained and a portion of the input data. For example, the model may be obtained from the model data store 104, and the training data may be obtained from the training data store 106. The training data may be stored in a local training data store 130 for use by the model training node 102A.

At block 406, the model scoring module 120 or some other module or component of the model training node 102A can process a subset of training data input to generate output. For example, if the model to be trained is a neural network-based acoustic model and the training data includes feature vectors computed from audio data of known user utterances, one or more of the feature vectors may be input to the model. As shown in FIG. 3, this input data may be referred to as an input vector 302. The model 304 may process the input vector 302 and generate an output vector 306.

At block 408, the gradient computation module 122 or some other module or component of the model training node 102A can generate a partial gradient based on the output vector 306. As shown in FIG. 3, the gradient computation module may use an objective function 308 to determine the error 310 for the output vector 306 in comparison with the known correct output for the particular input vector 302. For example, L2-norm or cross entropy may be used. The objective function 308 may be differentiable 312 with respect to the individual parameters of the model 304. Accordingly, the gradient computation module 122 may be configured to compute a partial gradient 314 that includes a collection of updates to the individual parameters of the model 304. In some embodiments, the elements of the partial gradient 314 (e.g., the individual update values) may be floating point numbers with both a magnitude and a direction (e.g., they may be positive or negative decimal numbers).

At block 410, the model synchronization module 124 or some other module or component of the model training node 102A can add the partial gradient to the residual gradient, aggregate values of individual elements of the partial gradient and residual gradient, or otherwise compute values based on the partial gradient and residual gradient. As shown in FIG. 3, the partial gradient 314 may be stored in the residual data store 132 or otherwise combined with the residual gradient. In adding the partial gradient 314 to the residual gradient, each individual update value from the partial gradient 314 can be added to the corresponding update value (e.g. the value for the same model parameter) of the residual gradient. Generally described, the residual gradient can be the collection of update values from one or more previous iterations of training data processing which have not yet been applied to the model parameters or transmitted to other model training nodes. The updates in the residual gradient may not have been applied because they may not yet exceed the required threshold or otherwise meet the criteria for inclusion in the salient gradient, described in greater detail below. In some cases, updates from many iterations may continue to be stored in the residual gradient when, e.g., they are so small that they do not meet the necessary threshold, even in aggregate. In other cases, updates from one iteration, originally stored in the residual gradient, may be negated by an update from a subsequent iteration (e.g., an update value of −0.1 for a given parameter may be negated by an update value of +0.1 for the same parameter as determined in a subsequent iteration). In still other cases, many small updates that are stored in the residual gradient may eventually exceed the necessary threshold in aggregate and may be included in the salient gradient accordingly. In such cases, the residual gradient value that corresponds to that particular parameter may be set to zero, null, or the like.

At decision block 412, the model synchronization module 124 or some other module or component can determine, for a given model parameter, whether a particular update value (the combined update value from the partial gradient and the residual gradient) meets or exceeds a threshold. If so, the process 400 may proceed to block 414; otherwise, the process 400 may proceed to decision block 416. In some embodiments, the threshold may be selected such that the total number of update values that exceeds the threshold is some predetermined number or range (e.g., 1/10,000 of the total number of update values in the gradient). In some embodiments, the threshold value may instead be based on an empirical determination of which update values provide substantial improvement to a model and which do not. In some embodiments, other methods of determining the threshold value may be used, or no threshold may be used. For example, a predetermined or dynamically determined number of update values may be included in the salient gradient (or model synchronization data), such as the top i values by magnitude, where i is some integer. In such cases, the actual magnitude to be met or exceeded in order to be included in the top i values may vary with each iteration. As another example, a predetermined or dynamically determined percentage of update values may be included, such as the top n percent of values by magnitude, where n is some number. In these and other examples, the actual number, percentage, or other portion of the update values may be determined based on available computing resources, such as bandwidth or processing capacity, or based on some other criteria.

At block 414, the model synchronization module 124 or some other module or component of the model training node 102A can include the update value in the salient gradient 316. Generally described, the salient gradient includes only those update values that exceed the threshold described above or which meet some other criteria, and is therefore much smaller (e.g., by several orders of magnitude) than the merged partial and residual gradients.

At decision block 416, the model synchronization module 124 or some other module or component of the model training node 102A can determine whether there are more update values in the merged partial and residual gradients to be considered. If so, the process 400 returns to block 412; otherwise, the process 400 proceeds to block 418.

At block 418, the model synchronization module 124 or some other module or component of the model training node 102A can exchange model synchronization data with other model training nodes 102B-102X. The model synchronization data can include the salient gradient, or data derived from the salient gradient (e.g., a projection or other transformation of the salient gradient or portions thereof), so that only those updates which have been deemed to be substantive or which have met some other criteria are provided to the other model training nodes 102B-102X. Because the salient gradient includes a subset of the aggregated or otherwise merged partial and residual gradients, some indicator of which model parameter corresponds to each update can be included; otherwise, a model training node may not be able to determine which update value is to be applied to which model parameter. For example, an integer value may be associated with each update value. The integer value can indicate the index or identifier of the model parameter to which the update value is to be applied. In some embodiments, the indices and associated update values may be stored in an array, list, or some other data structure. As shown in FIG. 3, model synchronization data including the salient gradient 316 may be provided to one or more other model training nodes 102B-102X, and model synchronization data including the salient gradients 318 may be obtained from one or more other model training nodes 102B-102X.

At block 420, the salient gradient 316 and the salient gradients 318 from other model training nodes 102B-102X may be applied to the current model 304. As a result, the model 304 may be synchronized or substantially synchronized with the models of the model training nodes 102B-102X with which the model training node 102A exchanged model synchronization data.

At decision block 422, the model training node 102 can determine whether there is more training data left to process using the model 304. If so, the process 400 can return to block 406. Otherwise, the process 400 may proceed to block 424.

At decision block 424, the model training node 102 can determine whether the model has converged (e.g., whether the output from the model has converged on the known correct output, whether the error 310 has converged on zero or is otherwise satisfactory, etc.). If so, the process 400 may terminate at block 426; otherwise, the process 400 may return to block 406.

Process for Asynchronous Model Synchronization

Figure 5:
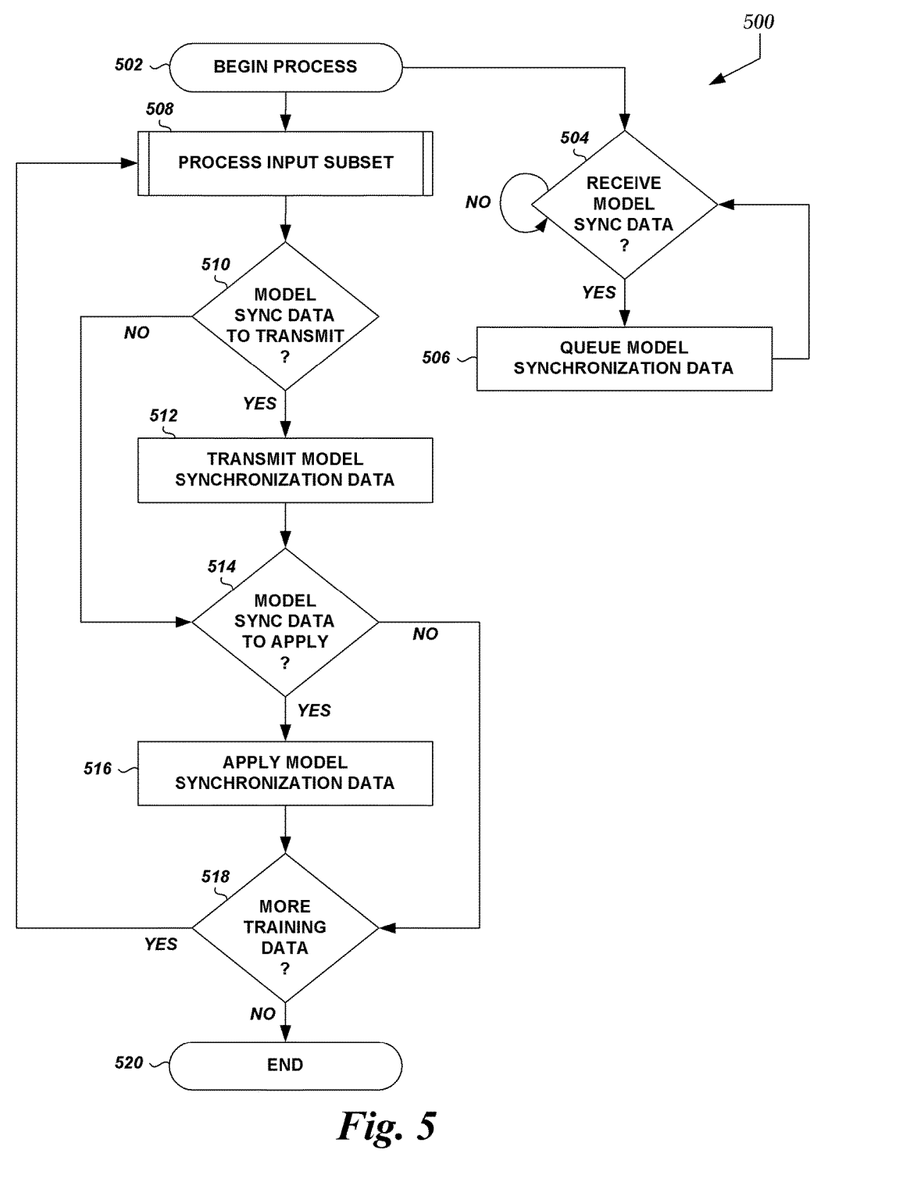
FIG. 5 is a flow diagram of an illustrative process for asynchronous updating of model parameters in a distributed model training environment.

FIG. 5 illustrates a sample process 500 for exchanging and applying model synchronization data across model training nodes in an asynchronous manner (e.g., without pausing training to wait for receipt of model synchronization data form other nodes). The process 500 may be used when, e.g., a model training node 102A has more processing power than another model training node 102B and is therefore able to process training data and generate model synchronization data more quickly, when a model training node 102A has fewer available resources than another model training node 102B and is therefore unable to process training data and generate model synchronization data as quickly, when different amounts of training data are provide to different model training nodes, when the execution of the training process does not otherwise proceed at the same rate, etc. Advantageously, the process 500 allows each individual model training node 102A to continue training without waiting for synchronization data from other model training nodes 102B-102X. Incoming synchronization data can be queued and applied when appropriate.

The process 500 begins at block 502. For example, process 500 may begin manually (e.g., in response to administrator initiation) or automatically (e.g., as scheduled or in response to some other event). The process 500 may be embodied in a set of executable program instructions stored on non-transitory computer-readable media, such as short-term or long-term memory of one or more computing devices associated with a model training node 102A. When the process 500 is initiated, the executable program instructions can be loaded and executed by the one or more computing devices.

At decision block 504, the model training node 102A can determine whether model synchronization data has been received from one or more other model training nodes 102B-102X. If so, the process 500 proceeds to block 506; otherwise, the process 500 may remain at decision block 504 to wait for model synchronization data to be received.

At block 506, the model synchronization data received from another node may be stored until the model training node 102A can apply it to its copy of model. In some embodiments, a queue 134 may be used to store the model synchronization data until it can be applied to the model. The sub-processes of blocks 504 and 506 may be performed and repeated in parallel with other sub-processes of the process 500, described in greater detail below. For example, the model training node 102 may receive model synchronization data form one or more training nodes 102B-102X and queue the data in parallel with the process of its own training data, as described below and in greater detail above.

At block 508, the model training node 102A can process a subset of training data as describe above. For example, the model training node 102A may generate a partial gradient, merge the partial gradient with a residual gradient, etc.

At decision block 510, the model synchronization module 124 or some other module or component of the model training node 102A can determine whether there is model synchronization data to transmit to other model training nodes 102B-102X. If so, the process 500 may proceed to block 512, where the model synchronization data is transmitted (e.g., as described above). Otherwise, the process 500 can proceed to decision block 514.

At decision block 514, the model synchronization module 124 or some other module or component of the model training node 102A can determine whether there is model synchronization data from one or more other model training nodes 102B-102X to be applied to the local copy of the model. For example, the queue 134 can be inspected to determine whether unapplied model synchronization data is present. If so, the process 500 can proceed to block 516, where the model synchronization data is applied to the local copy of the model (e.g., individual update values are applied to corresponding parameters). Otherwise, the process 500 can proceed to decision block 518.

At decision block 518, the model training node 102A can determine whether there is training data remaining to be processed (or whether the model has converged), as described in greater detail above. If so, the process 500 can return to block 508; otherwise, the process 500 can terminate at block 520.

Process for Quantization of Model Synchronization Data

Figure 6:
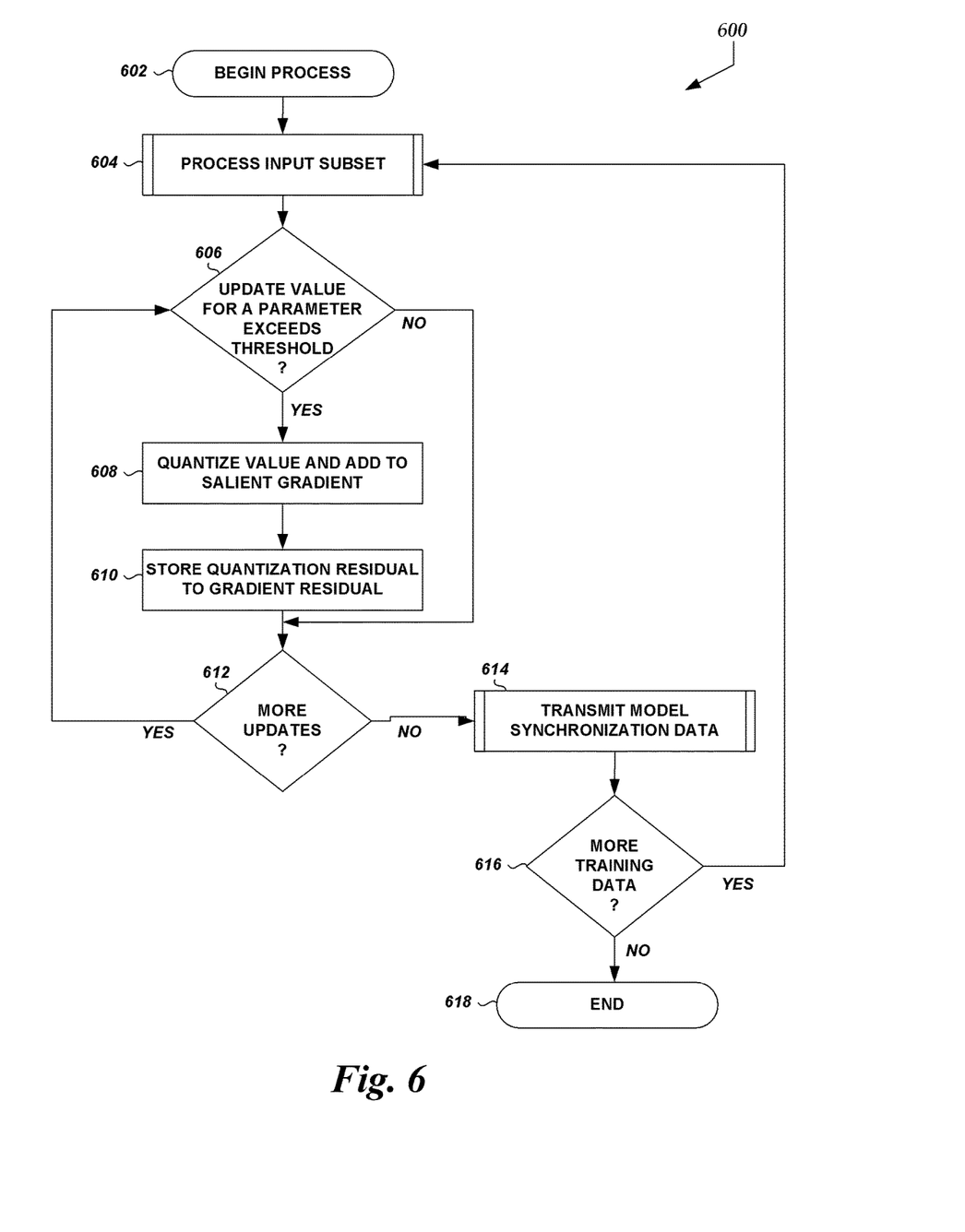
FIG. 6 is a flow diagram of an illustrative process for quantization of model synchronization data in a distributed model training environment.

FIG. 6 illustrates a sample process 600 for further compressing model synchronization data in order to further reduce bandwidth requirements and improve efficiency and performance of the distributed model training process. Advantageously, update values of the salient gradient can be quantized (e.g., rounded), and the quantization residual (e.g., the portion that is rounded off) can be stored in the residual gradient, thereby ensuring that the full magnitude of the updates to each model parameter may be preserved and no data is irretrievably lost.

The process 600 begins at block 602. For example, process 600 may begin manually (e.g., in response to administrator initiation) or automatically (e.g., as scheduled or in response to some other event). The process 600 may be embodied in a set of executable program instructions stored on non-transitory computer-readable media, such as short-term or long-term memory of one or more computing devices associated with a model training node 102A. When the process 600 is initiated, the executable program instructions can be loaded and executed by the one or more computing devices.

At block 604, the model training node 102A can process a subset of training data as described above. For example, the model training node 102A may generate a partial gradient, merge the partial gradient with a residual gradient, etc.

At decision block 606, the model synchronization module 124 or some other module or component of the model training node 102A can determine whether a particular update value of a partial gradient (or merged partial and residual gradient) exceeds a threshold or meets some other criteria, as described above. If so, the process 600 may proceed to block 608; otherwise, the process 600 can proceed to decision block 612.

At block 608, the update value that was determined above to exceed the threshold or meet other criteria can be quantized to further reduce the amount of data (e.g., the size of the model synchronization data structure) that must be transmitted to other model training nodes 102B-102X. The quantization applied by the model training node 102A may include converting the update value to one of a smaller set of values. For example, the model training node 102 may use a mapping of ranges of update values to a predefined set of values; the model training node 102 may round each value to some unit of precision; etc. In one specific, non-limiting embodiment, the un-quantized update value may be a 32 or 64 bit floating point number, and it may be quantized to an 8 bit number. The index of the parameter to which the quantized update is to be applied may remain a 24 bit integer. Therefore, the combination of index and quantized value for a given parameter may be stored as a 32 bit structure.

At block 610, the model training node 102A may store the quantization residual (e.g., the difference between the quantized value and the original value, such as the portion of the value that has been rounded off) in the residual gradient, as described above. In this way, the entire magnitude of the update determined above can be retained, even if a portion of it is not presently applied to the model. By storing the quantization residual in the residual gradient, it may be applied to the model if one or more subsequent updates, when summed with the quantization residual, meet or exceed the threshold or meet some other criteria.

At decision block 612, the model synchronization module 124 or some other module or component of the model training node 102A can determine whether there are more update values in the merged partial and residual gradients to be considered. If so, the process 600 returns to block 606; otherwise, the process 600 proceeds to block 614.

At block 614, the model synchronization module 124 or some other module or component of the model training node 102A can transmit model synchronization data to one or more other model training nodes 102B-102X, as described above. The model synchronization data can include the quantized update values and some indicium of the model parameter to which each of the quantized update values is to be applied.

At decision block 616, the model training node 102A can determine whether there is training data remaining to be processed (or whether the model has converged), as described in greater detail above. If so, the process 600 can return to block 604; otherwise, the process 600 can terminate at block 618.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a first computing device and a second computing device;
   wherein the first computing device is configured by executable instructions to:
   process, using a neural network comprising a plurality of trainable parameters, a training data input vector to generate an output vector;
   compute a gradient based at least on the output vector, the gradient comprising a plurality of gradient values and the gradient corresponding to the plurality of trainable parameters;
   add the gradient to a residual gradient comprising a first plurality of residual gradient values, wherein the first plurality of residual gradient values comprises values by which corresponding trainable parameters of the neural network are to be updated;
   select a first subset of the first plurality of residual gradient values, wherein individual residual gradient values of the first subset of the first plurality of residual gradient values are selected for the first subset based on the individual residual gradient values exceeding a threshold;
   transmit a first transmission comprising the first subset of the first plurality of residual gradient values to the second computing device configured to process training data using a separate version of the neural network, wherein the first transmission comprises residual gradient values corresponding to less than all of the plurality of trainable parameters;
   receive a second transmission comprising a second subset of a second plurality of residual gradient values from the second computing device; and
   modify one or more of the trainable parameters using the first subset of the first plurality of residual gradient values and the second subset of the second plurality of residual gradient values;
   wherein the second computing device is configured by executable instructions to:
   transmit the second transmission to the first computing device, wherein the second transmission comprises residual gradient values corresponding to less than all of a plurality of trainable parameters of the separate version of the neural network;
   receive the first transmission from the first computing device; and
   modify one or more of the trainable parameters of the separate version of the neural network using the first subset of the first plurality of residual gradient values and the second subset of the second plurality of residual gradient values; and
   wherein the system is configured to generate a trained version of the neural network using the one or more trainable parameters of the separate version of the neural network that have been modified.

2. The system of claim 1, wherein the first computing device is further configured by executable instructions to determine the threshold using the plurality of residual gradient values.

3. The system of claim 1, wherein the first computing device is further configured by executable instructions to change a first residual gradient value in the residual gradient to zero in response to at least one of: modifying a trainable parameter based on the first residual gradient value or transmitting the first residual gradient value.

4. The system of claim 1, wherein the first computing device is further configured by executable instructions to quantize at least one of the plurality of residual gradient values prior to transmitting the at least one of the plurality of residual gradient values.

5. A computer-implemented method comprising:
under control of a first computing device of a plurality of computing devices of a system:
computing a first set of parameter update values corresponding to parameters of a model;
modifying a second set of parameter update values using the first set of parameter update values, wherein the second set of parameter update values comprises values by which corresponding parameters of the model are to be updated;
selecting a subset of the second set of parameter update values, wherein individual parameter update values of the second set of parameter update values are selected for the subset based at least partly on a magnitude of the individual parameter update values satisfying a criterion;
transmitting, to a second computing device of the plurality of computing devices, first model synchronization data comprising the subset of the second set of parameter update values, wherein the first model synchronization data comprises parameter update values for less than all of the parameters of the model;
receiving, from the second computing device, second model synchronization data comprising a subset of a third set of parameter update values, the third set of parameter update values computed by the second computing device; and
modifying a first parameter of the model using the subset of the third set of parameter update values and the subset of the second set of parameter update values to generate a modified first parameter; and
under control of the second computing device:
transmitting the second model synchronization data to the first computing device, wherein the second model synchronization data comprises parameter update values for less than all parameters of the model;
receiving the first model synchronization data from the first computing device; and
modifying a second parameter of the model using the subset of the second set of parameter update values and the subset of the third set of parameter update values to generate a modified second parameter; and
generating, by at least one of the plurality of computing devices, a trained version of the model using at least one of the modified first parameter or the modified second parameter.

6. The computer-implemented method of claim 5, wherein the model comprises one of a neural network, a conditional random field, or a support vector machine.

7. The computer-implemented method of claim 5, wherein the criterion comprises the individual parameter update values having one of: a magnitude exceeding a threshold; a magnitude in the top i magnitudes of the second set of parameter update values, where i is some integer; or a magnitude in the top n percent of the second set of parameter update values, where n is some number.

8. The computer-implemented method of claim 5, further comprising changing, by the first computing device, a first parameter update value in the second set of parameter update values to zero in response to one of: modifying a parameter of the model based on the first parameter update value or transmitting a value based at least partly on the first parameter update value in the first model synchronization data.

9. The computer-implemented method of claim 5, further comprising quantizing, by the first computing device, a first parameter update value of the second set of parameter update values to generate a first quantized update value, wherein the first model synchronization data includes the first quantized update value.

10. The computer-implemented method of claim 9, further comprising storing, by the first computing device, a quantization residual, generated from quantizing the first parameter update value, in the second set of parameter update values.

11. The computer-implemented method of claim 5, wherein the first computing device is configured to process a first subset of training data with a first version of the model, and wherein the second computing device is configured to process a second subset of the training data with a second version of the model.

12. The computer-implemented method of claim 11, wherein the first version of the model and the second version of the model are copies of a single model.

13. The computer-implemented method of claim 5, further comprising storing, by the first computing device, the second model synchronization data in a queue.

14. The computer-implemented method of claim 5, wherein computing the first set of update values comprises:
computing test model output using training data input;
computing an error amount by which the test model output differs from an expected model output associated with the training data input; and
computing a gradient indicating an amount by which individual parameters of the model are to be adjusted to reduce the error amount, wherein individual parameter update values of the first set of parameter update values are based on the gradient.

15. The computer-implemented method of claim 5, wherein modifying the first parameter of the model comprises adding, to a value of the first parameter: (1) a first value of the subset of the second set of parameter update values; and (2) a second value of the subset of the third set of parameter update values.

16. A system comprising a first computing device and a second computing device;
wherein the first computing device is configured to at least:
compute a first set of parameter update values corresponding to parameters of a model;
modify a second set of parameter update values based at least partly on the first set of parameter update values, wherein the second set of parameter update values comprises values by which corresponding parameters of the model are to be updated;
select a subset of the second set of parameter update values, wherein individual parameter update values of the second set of parameter update values are selected for the subset based at least partly on a magnitude of the individual parameter update values satisfying a criterion;
transmit, to the second computing device, first model synchronization data comprising the subset of the second set of parameter update values, wherein the first model synchronization data comprises parameter update values for less than all of the parameters of the model;
receive, from the second computing device, second model synchronization data comprising a subset of a third set of parameter update values; and
modify at least a first subset of the parameters of the model using the subset of the third set of parameter update values and the subset of the second set of parameter update values;
wherein the second computing device is configured to at least:
transmit the second model synchronization data to the first computing device, wherein the second model synchronization data comprises parameter update values for less than all parameters of the model;
receive the first model synchronization data from the first computing device; and
modify at least a second subset of the parameters of the model using the subset of the second set of parameter update values and the subset of the third set of parameter update values; and
wherein the system is configured to generate a trained version of the model using at least one of the first subset of parameters that have been modified or the second subset of parameters that have been modified.

17. The system of claim 16, wherein the model comprises one of a neural network, a conditional random field, or a support vector machine.

18. The system of claim 16, wherein the second set of parameter update values comprises one or more residual update values based at least partly on one or more parameter update values previously used to modify parameters of the model.

19. The system of claim 18, wherein the first computing device is further configured to change a first residual update value in the second set of parameter update values to zero in response to one of: modifying a parameter based on the first residual update value or transmitting a value based at least partly on the first residual update value in the first model synchronization data.

20. The system of claim 16, wherein the first computing device is further configured to quantize a first parameter update value of the second set of parameter update values to generate a first quantized update value, wherein the first model synchronization data comprises the first quantized update value.

21. The system of claim 20, wherein the first computing device is further configured to store a quantization residual, generated from quantizing the first parameter update value, in the second set of parameter update values.

22. The system of claim 16, wherein the first computing device is configured to process a first subset of training data with a first version of the model, and wherein the second computing device is configured to process a second subset of the training data with a second version of the model.

23. The system of claim 22, wherein the first version of the model and the second version of the model are copies of a single model.

24. The system of claim 16, wherein the first computing device is further configured to store the second model synchronization data in a queue.

25. The non transitory computer readable medium system of claim 16, wherein the criterion comprises the individual parameter update values having one of: a magnitude exceeding a threshold; a magnitude in the top i magnitudes of the second set of parameter update values, where i is some integer; or a magnitude in the top n percent of the second set of parameter update values, where n is some number.

26. The non transitory computer readable medium system of claim 16, wherein the first computing device being configured to modify at least the first subset of the parameters of the model comprises the first computing device being configured to add, to a value of a first parameter of the first subset of parameters of the model: (1) a first value of the subset of the second set of parameter update values; and (2) a second value of the subset of the third set of parameter update values.

* * * * *

UNITED STATES PATENT AND TRADEMARK OFFICE
CERTIFICATE OF CORRECTION

PATENT NO. : 10,152,676 B1
APPLICATION NO. : 14/087852
DATED : December 11, 2018
INVENTOR(S) : Nikko Strom Page 1 of 1

It is certified that error appears in the above-identified patent and that said Letters Patent is hereby corrected as shown below:

In the Claims

In Column 18, Line 24 (Approx.), Claim 25, after "The" delete "non transitory computer readable medium".

In Column 18, Line 32 (Approx.), Claim 26, after "The" delete "non transitory computer readable medium".

Signed and Sealed this
Twenty-eighth Day of April, 2020

Andrei Iancu
*Director of the United States Patent and Trademark Office*